United States Patent
Schleede et al.

(10) Patent No.: US 10,367,957 B1
(45) Date of Patent: Jul. 30, 2019

(54) HIGHLY-SCALABLE NATIVE FLEET MANAGEMENT

(71) Applicant: Xerox Corporation, Norwalk, CT (US)

(72) Inventors: Kenneth B. Schleede, Webster, NY (US); Noah Ullmann, Rochester, NY (US); Yolanda R. Zhesnik, Webster, NY (US); Jefferson Spiers Tuttle, Rochester, NY (US); Keith Watson, Spencerport, NY (US); Michael William Barrett, Fairport, NY (US); Wendy Abbott, Rochester, NY (US); Mirelsa Fontanes-Perez, Webster, NY (US); Paul Roberts Conlon, South Bristol, NY (US); Mark Allen Sixbey, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/158,771

(22) Filed: Oct. 12, 2018

(51) Int. Cl.
| | |
|---|---|
| *H04N 1/00* | (2006.01) |
| *H04L 12/24* | (2006.01) |
| *H04L 29/08* | (2006.01) |
| *G06F 21/62* | (2013.01) |
| *G06F 21/64* | (2013.01) |
| *G06F 11/14* | (2006.01) |
| *G06F 16/958* | (2019.01) |
| *G06F 16/901* | (2019.01) |

(52) U.S. Cl.
CPC ..... *H04N 1/00344* (2013.01); *G06F 11/1464* (2013.01); *G06F 16/9024* (2019.01); *G06F 16/958* (2019.01); *G06F 21/6218* (2013.01); *G06F 21/64* (2013.01); *H04L 41/0803* (2013.01); *H04L 41/0893* (2013.01); *H04L 41/12* (2013.01); *H04L 67/06* (2013.01); *H04L 67/34* (2013.01); *H04N 1/00973* (2013.01); *H04N 2201/0039* (2013.01); *H04N 2201/0094* (2013.01)

(58) Field of Classification Search
CPC ..... H04N 1/00344; H04L 67/34; H04L 41/12; H04L 41/0803; G06F 21/64
See application file for complete search history.

(56) References Cited

U.S. PATENT DOCUMENTS

| | | |
|---|---|---|
| 6,026,436 A | 2/2000 | Hawes |
| 7,987,241 B2 | 7/2011 | St Jacques, Jr. et al. |
| 9,563,418 B1 * | 2/2017 | Walton ............... G06F 8/654 |

* cited by examiner

*Primary Examiner* — Eric A. Rust
(74) *Attorney, Agent, or Firm* — Fay Sharpe LLP (57) ABSTRACT

A method of providing native scalable management of a fleet of managed devices, which includes establishing a Trust Community, which includes a sub-set of the managed devices, organizing the Trust Community, configuring one of the managed devices in the organized Trust Community as a Root Device to publish files via a file sharing function, adding the Root Device to a distribution profile stored in a database, creating or downloading files via the Root Device, and sharing the files with other devices in the organized Trust Community via the Root Device. Any devices on hold or offline are placed in a temporary working area for reorganizing. Download and install schedules are set up on a per device or a bulk basis according to policies. Files are placed into a staging area before re-distribution and checked for security, integrity, and/or completeness via checksums, digitally signed certificates, and/or internal structure checks.

20 Claims, 9 Drawing Sheets

HIGHLY-SCALABLE NATIVE FLEET MANAGEMENT

BACKGROUND

The exemplary embodiment relates to a system and method for managing data-receiving devices and finds particular application in connection with a method of providing native scalable management of a fleet of managed devices.

Computer-operated image forming devices, such as printers and copiers and the like, often require software updates to manage security or other settings. Managing a fleet of such devices is common today. However, managing such a fleet generally requires a separate server, which is both costly and complex to set up and maintain. While well-suited for larger corporations, this approach is generally not viable for many businesses.

Thus, while larger organizations, with a large number of devices, may have a substantial, highly-trained support staff to handle updates to a fleet of devices and large, expensive dedicated external servers, such resources may be impractical for smaller organizations. It would be helpful for both small and larger organizations to be able to efficiently manage the distribution of files across a fleet of devices with built-in functionality.

Centrally managed topologies have benefits and challenges. For example, it can be a bottleneck in the distribution of large files (e.g., software upgrades) when many devices attempt to simultaneously download from the same server. This and other issues present a barrier to entry into fleet management and file distribution.

There remains a need for a system and method for distributing files across a fleet of devices in a way which facilitates efficient data distribution and device management and scales as needed.

BRIEF DESCRIPTION

In accordance with an aspect of the exemplary embodiment, a method of providing native scalable management of a fleet of managed devices is disclosed. The method includes establishing a Trust Community, which includes a sub-set of the managed devices in the fleet, organizing the Trust Community, configuring one of the managed devices in the organized Trust Community as a Root Device to publish files via a file sharing function, adding the Root Device to a distribution profile stored in a database, creating or downloading one or more files via the Root Device, and sharing the one or more files with other devices in the organized Trust Community via the Root Device, Any devices in the Trust Community that are on hold or offline are placed in a temporary working area for reorganizing. Download and install schedules for the one or more files are set up on a per device or a bulk basis according to one or more policies such as installing if new content and/or installing always. And files that are to be shared are placed into a staging area before re-distribution and checked for security, integrity, and/or completeness via checksums, digitally signed certificates, and/or internal structure checks.

In accordance with another aspect of the exemplary embodiment, a system for providing native scalable management of a fleet of managed devices is disclosed. The system includes memory and a processor configured to: establish a Trust Community, which includes a sub-set of the managed devices in the fleet, organize the Trust Community, configure one of the managed devices in the organized Trust Community as a Root Device to publish files via a file sharing function, add the Root Device to a distribution profile stored in a database, create or download one or more files via the Root Device, and share the one or more files with other devices in the organized Trust Community via the Root Device. Any devices in the Trust Community that are on hold or offline are placed in a temporary working area for reorganizing. Download and install schedules for the one or more files are set up on a per device or a bulk basis according to one or more policies such as installing if new content and/or installing always. And files that are to be shared are placed into a staging area before re-distribution and checked for security, integrity, and/or completeness via checksums, digitally signed certificates, and/or internal structure checks.

A non-transitory computer readable medium operable to perform a set of instructions, wherein when said instructions are executed on a computer, cause the computer to perform a method of providing native scalable management of a fleet of managed devices. The method includes establishing a Trust Community, which includes a sub-set of the managed devices in the fleet, organizing the Trust Community, configuring one of the managed devices in the organized Trust Community as a Root Device to publish files via a file sharing function, adding the Root Device to a distribution profile stored in a database, creating or downloading one or more files via the Root Device, and sharing the one or more files with other devices in the organized Trust Community via the Root Device. Any devices in the Trust Community that are on hold or offline are placed in a temporary working area for reorganizing. Download and install schedules for the one or more files are set up on a per device or a bulk basis according to one or more policies such as installing if new content and/or installing always. And files that are to be shared are placed into a staging area before re-distribution and checked for security, integrity, and/or completeness via checksums, digitally signed certificates, and/or internal structure checks.

Optionally, and in accordance with any of the above aspects of the exemplary embodiment, the Trust Community is organized as a graph including layers, as a tree, by using a static topology which is changed only by explicit demand of a system administrator, and/or by using a dynamic topology which is self-organizing and includes dynamic routing.

Optionally, and in accordance with any of the above aspects of the exemplary embodiment, the managed devices are organized as nodes of a tree structure, wherein one of the managed devices in the tree structure is defined as a Root Device and each device in the tree has a Parent Device, zero or one or more sibling devices, and zero or one or more Child Devices.

Optionally, and in accordance with any of the above aspects of the exemplary embodiment, the one or more files shared comprise one or more of software update files, user-content files such as print jobs, fax jobs, scanned images or other user generated files, encrypted configuration files, and workflow templates add-on files.

Optionally, and in accordance with any of the above aspects of the exemplary embodiment, the fleet of managed devices comprises one or more of printers, copiers, scanners, and multifunction devices (MFDs).

Optionally, and in accordance with any of the above aspects of the exemplary embodiment, transfer of control of the fleet between peer devices is made for disaster recovery, for convenience, for local sub trees, and/or for upgrading to external management systems.

Optionally, and in accordance with any of the above aspects of the exemplary embodiment, the method further comprises traversing the topology and the database to locate missing or incorrect relationship information and exporting graph topology information for analysis.

DETAILED DESCRIPTION

Aspects of the exemplary embodiment relate to a system and method for managing a fleet of devices, such as multi-function printers (MFPs) and multi-function devices (MFDs), which facilitates the distribution of files across a fleet of devices and performing other group actions.

A new file sharing function helps the system administrator set up a fleet of devices. With this function, the system administrator can set up one device and have it share files automatically, so that all the devices are set up the same way without further intervention. This file sharing function allows the system administrator to share device files across all devices. The files that can be shared include, but are not limited to, software update files, encrypted configuration files, workflow templates add-on files, user-content files, and the like.

To assist in file distribution and other group actions, a group of managed devices, such as printers and copiers, may be considered as nodes of a directed graph, such as a tree structure, in which each device in the tree may have a parent device, zero, one or more sibling devices, and zero, one or more child devices. In a tree structure, no node has more than one parent node, which can be a root node or a descendant of the root node.

The relationships between the nodes in the tree may be encoded in a database table, which allows the devices to be sorted using queries. In many cases, however, the tree structure may be relatively flat, with large numbers of sibling nodes. The devices may be sorted, which allows groups of siblings to be identified within a graph and thus be treated differently, e.g., for file distribution. By virtue of using a graph/tree structure, based on an adjacency list to manage device relationships, many other benefits will be possible. This approach allows for automated traversal of a graph/tree using algorithms like Depth First Search, for diagnosing a tree for connection issues, or counting devices in a tree, or advanced visualization (graphics) of the topology, among other things.

Figure 1:
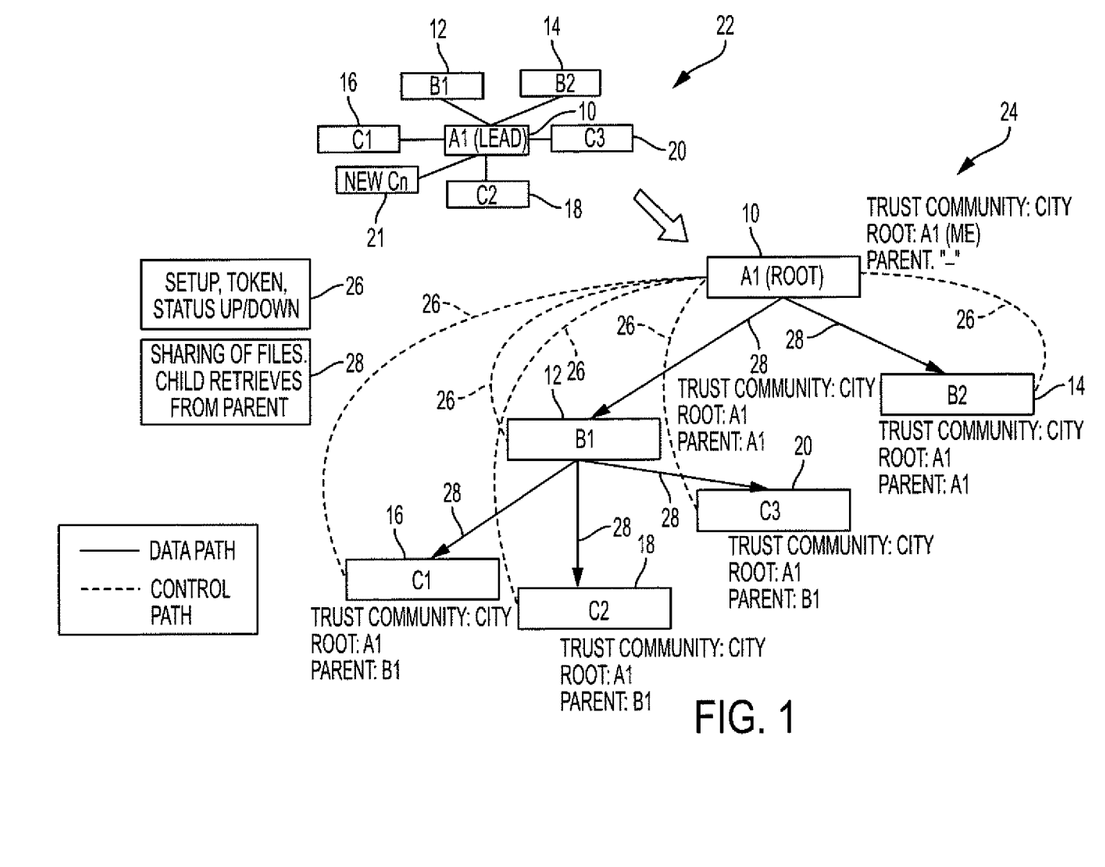
FIG. 1 illustrates an example Trust Community and directed tree structure for managing a fleet of devices in accordance with an aspect of the exemplary embodiment.

FIG. 1 illustrates an exemplary fleet of managed devices 10, 12, 14, 16, 18, 20, etc., forming at least one Trust Community 22. While six devices are illustrated, it is to be appreciated that there may be any number of devices (e.g., 20, 50, 100, etc.) in the network. The exemplary devices are generally image forming devices, such as printers, copiers, scanners, and multi-function printers (MFPs)/multi-function devices (MFDs), which perform printing as well as other functions, such as printing, copying, scanning, and/or faxing. A fleet of such devices may be distributed across an organization, in different physical locations and/or used by people in different departments and/or having different job functions/device requirements. Generally, identical updates to the devices are often not desirable across the entire fleet. However, in some cases, to simplify device management it is desirable to normalize a fleet to the same settings.

The system administrator may then set up the devices 10, 12, 14, 16, 18, 20, etc. in an organizational structure, such as a tree structure (or distribution tree) 24 (e.g., from a web-based user interface) for file distribution. It is noted that while the exemplary embodiment is described in connection with a tree structure, more general distribution approaches are equally possible. For example, approaches such as self-organizing distribution topologies and associated mechanisms, or a graph vs. tree topology, may be considered. In this example, one of the devices (i.e., device 10) is set up to act as a root (or publisher device) and distribute data to the managed devices. At the root (or publisher) device 10, the system administrator establishes a secure connection with the other devices 12, 14, 16, 18, 20, etc. using administrator credentials, and that connection persists once it is established (e.g., through an access token). The system administrator can set up download and install schedules, so downloads can happen at a given time of the day and then have the installation process happen outside of usage hours. The system administrator can choose to have files install immediately after download.

If the system administrator is concerned that settings have changed on the devices during the day, they can set up an "Always Install" policy, so that the configuration/workflow templates file(s) are reapplied daily or at a preferred schedule. The system administrator can also go to a subscribing device and get the file for that device at any moment. Devices can be set up to download from other devices down the tree 24 to balance the load on the network. Thus, described herein is a "pull" model. But it is to be understood that the exemplary embodiment would work with either "push" or "pull" models. Further, partitioning the load by changing your topology is one way to balance loads. Alternatively, a random offset for schedules or an exponential backoff retry mechanism could be used to minimize "request for download" collisions. For example, if actual download times are randomly staggered, the likelihood of overloading a parent is lessened. Each device acting as a parent can handle multiple, concurrent downloads.

Exemplary devices 12 and 14 are considered siblings of each other because they all receive files from the same Parent Device 10, at least in some circumstances. However, device 12 may require different settings than device 14, e.g., because they serve different roles, based, for example, on the job functions of their users. Likewise, devices 16, 18, and 20 are considered siblings of each other because they all receive files from the same Parent Device 12, at least in some circumstances.

The dashed lines 26 show control path connections between the root and various other devices for communicating set up information, tokens, and status, among other things. The solid lines 28 show data path connections between the root and various other devices for sharing of files, i.e., the child device retrieves the files from the parent device.

As shown in FIG. 1, certain information relating to a given device within the tree structure 24 is stored, such as the Trust Community (e.g., the city where the devices are located), the Root Device, and the Parent Device. For example, for the Root Device 10, the Trust Community name/identifier is the city where the devices are located, the root is "A1," and the Parent is "None." For device 12, the Trust Community is the city where the devices are located, the root is "A1," and the Parent is "A1," and so on for each of the devices in the tree 24.

The tree structure 24 is a convenient connectivity paradigm. It is noted that the simplest tree can just be a hub and spoke all children connected to a single parent/root, no further levels. This is ideal for very small business setups and can scale if/when a business scales. The system administrator can quickly add and manage devices, including bulk adds/deletes/updates across sets of devices. Also, groups of settings can be efficiently added to sets of devices in a single operation. The system administrator can minimize or eliminate bottlenecks quickly by configuring the distribution tree 24 to introduce new levels of devices connected via a tree topology so that basic load balancing occurs. It is further noted that the ability to scale is natively built-in. It is noted that using an embedded database, full up web services, and simplified security set-up/usability makes it more effective.

The tree structure 24 uses a simple drag and drop paradigm. A new "unassociated" branch preserves subtrees when a device is either deleted or removed. The system administrator can quickly move over entire subtrees to any place in the tree making the management simple and robust. The concept of "unassociated" will work for either device connectivity or content. Further, any device in the group can send and/or receive files. The concept of "unassociated" provides continuity in improving the ease of use for setting up a distribution tree. The ability of any device being capable of being either a root publisher (content provider) or subscriber (content consumer) is "symmetric".

Figure 2:
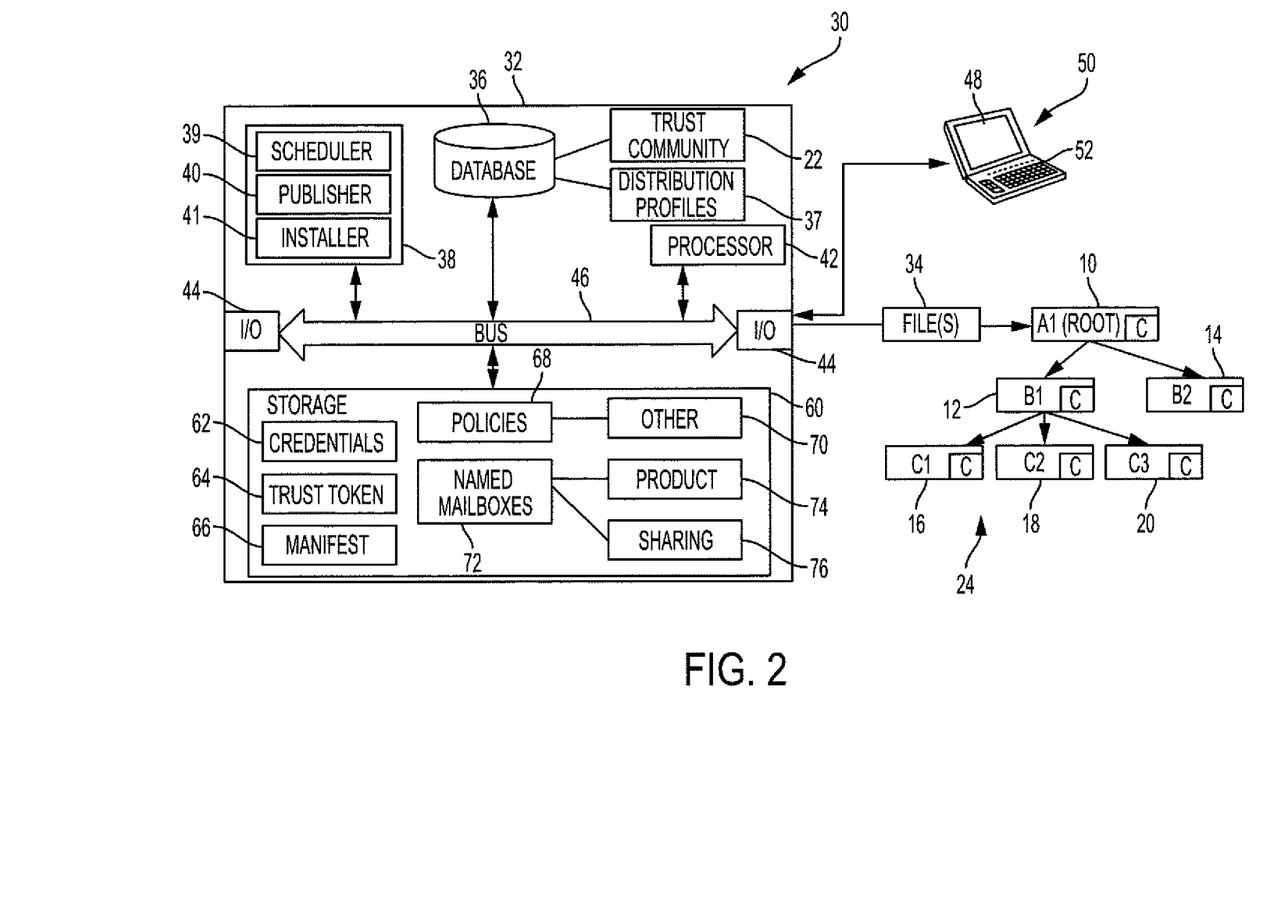
FIG. 2 is a functional block diagram of a printing system incorporating the tree structure of FIG. 1 in accordance with an aspect of the exemplary embodiment.

With reference now to FIG. 2, an exemplary network enterprise fleet management system 30 incorporating the tree structure 24 of FIG. 1 is shown. The system 30 includes a network controller 32 for distributing data 34 to the devices 10, 12, 14, 16, 18, 20, etc., among other entities. The data 34 may include, but is not limited to, updates to the devices in the form of one or more files 34, such as configuration files, and may be distributed via wired or wireless links 36, such as a local area network, wide area network, or the like. In the case of image forming devices, the distributed files 34 may include, for example, updates to device security settings and/or settings related to the performance of printing, scanning, copying, and the like. It should be noted that the connectivity between devices uses web services protocols and while the preferred embodiment has been described with respect to LAN (if connecting across the globe), the exemplary embodiment is equally suitable over the cloud. It could, for example, integrate with (layer over) a cloud pub-sub service or storage mechanism.

Exemplary devices 12 and 14 are considered siblings of each other because they both receive the file 34 from the same Parent Device 10, at least in some circumstances. However, device 12 may require different settings than device 14, e.g., because they serve different roles, based, for example, on the job functions of their users. Likewise, devices 16, 18, and 20 are considered siblings of each other because they all receive the file 34 from the same Parent Device 12, at least in some circumstances. The configuration file 34 may also include publishing information which specifies, for each of the managed devices, the Child Device(s) to which it is to distribute the configuration file 34, and a time schedule for doing so. This publishing information may be stored in the managed devices and thus need only be included in the data file 34 when changes are made (or may be sent in a separate file). To clarify, the control path adds child devices to the tree, sends schedule information, exchanges status info (polling/notification), shares a token which allows a device to participate within a Trust Community. The data path acquires files per schedule, installs, verifies content, and republishes/shares content/files to its child devices.

The tree structure 24 includes the network controller 32, the highest-level node in the tree, which in this example represents the source of the file 34, in this case, the network controller 32, although in some embodiments, it could be any one of the managed devices. Device 10 has been set up as the root node, a first-level node. Child nodes 12 and 14 of the root are second-level nodes, representing managed devices in the network (named B1 and B2) which receive data files 34 directly from the Root Device 10. Child nodes 12 and 14 are siblings of each other because they all have the same parent node. Child nodes 16, 18, and 20 are third-level nodes and receive data files 34 from a parent node 12. The illustrative tree structure 24 shown in FIG. 2 has two levels below the root node. However, there may be fewer or more than two levels, such as from 1-10 levels. For example, some of the nodes at the third level may have child nodes forming a fourth distribution level and so forth.

With continued reference to FIG. 2, the network controller 32 includes a database 36, such as a graph database, which stores information about the devices 10, 12, 14, 16, 18, 20, including the Trust Community 22 and distribution profiles 37, among other things, in the form of one or more database tables (not shown). The database 36 may include various other types of information, such as distribution profiles and attributes for a particular device or other entity and parent-child relationships between pairs of devices. The parent-child relationships may be manually entered in the database and can be modified. Different parent-child relationships may be established for different types of file distribution. The parent-child relationships may be selected based on available network connections, network connection costs, network speed, device locations, download schedules and/or other user-selected criteria. Further, a normal login mechanism has been extended to now be part of security associated with adding a device to the Trusted Community. The same login to a remote device is used to authenticate is used in the sharing of an Access Token mechanism. This extends the reach to less sophisticated environments where the device-device security is built-in and managed simply. Once the device is added via the simple login, subsequent trusted operations/communications occur between devices. Just as a costly, external server is not needed to manage the devices, this system also provides a way to handle fleet security built-in.

Devices 10, 12, 14, 16, 18, 20, etc., mentioned in a given database table may each have a set of attributes listed in fields of the table or otherwise stored in memory, such as in a separate linked table. Each attribute in a given field is selected from a set of attributes. The fields may include some or all of device name, device model, device user function, location, and Update Schedule. The device name attribute is a unique identifier, such as an alphanumeric identifier or a more complex naming scheme may be employed, such as "Guest printer 1," "Admin printer," or a mix of IP addresses, HostNames and fully-qualified domain names (FQDNs), and so forth. The device name may be unrelated to the role of the device, thus sorting of the database table based on device name may not yield useful information about the relationships between devices. The device user function is used for indicating the general function of the users of the device. For example, some of the devices may be used by people in the Quality Assurance (QA) department, while others are used by the Development (Dev) department or IT department. A location field can be used to identify respective locations of the devices. A given table may be linked to other tables in the database, such as a table which provides some of these fields and/or different fields for each of the devices. While the attributes are stored in one of the database tables, the attributes may be identified from another source, such as a list or other source of information. It is noted that any device can be a root or member of the tree—each device has an embedded database.

Further, the database 36 stores the information in a form which can be queried with queries, such as SQL (Structured Query Language) queries. A query generally specifies the database table and the column or columns of the table to use in sorting. The results of an SQL query may be stored in the form of an adjacency list, or other information from which such an adjacency list can be generated. The exemplary adjacency list corresponds to a directed acyclic graph (a tree). In graph theory, an adjacency list is a collection of unordered sub-lists (a nested sort) used to represent a finite graph. Each sub-list includes the set of children of a node in the graph. The adjacency list makes it possible to programmatically "walk" (traverse) the directed tree using, for example, a Depth First Search. A sorted adjacency list includes the information provided in the adjacency list, but also provides sorted sub-lists. In particular, managed devices having a common parent device are ordered based on common attributes in the sorted adjacency list. To clarify, the database 36 can be used for both sorting and filtering data.

As shown in FIG. 2, the network controller 32 has access to the database 36 and/or to information extracted therefrom, such as the Trust Community 22 and distribution profiles 37. The computer-implemented network controller 32 includes memory 38, which stores instructions for performing the method described herein, including scheduler 39, publisher 40, and installer 41 functions, and a processor 42, in communication with the memory, for executing the instructions. The database 36 may be stored in memory 38 and/or in a remote memory storage device (not shown), which is accessible by a wired or wireless link(s). The network controller 32 includes one or more input/output (I/O) devices 44 for communicating with external devices, such as the Root Device 10 of the tree structure 24. While a single network controller 32 is shown, there may be two or more file network controllers 32 on the same server, or on separate servers. Each file network controller may control file distribution to a respective set of managed devices. This may be supported via secure APIs.

Hardware components 38, 42, 44 of the network controller 32 are communicatively connected by a data/control bus 46. A display device 48 allows a human user to view information generated by the database 36, such as a sorted graph serving as a distribution tree. The display device 48 may be a computer monitor of a client device 50, in communication with the network controller 32. A user input device 52, such as a keyboard, keypad, touch screen, computer mouse, combination thereof, or the like, allows a user to input data and commands to the processor 42.

A storage element 60 may store various types of information relating to the devices to help manage the rules, including credentials 62, trust tokens 64 for authorization, manifests 66 that list what files are available, policies 68 that control how the files are implemented on the devices and/or other user-selected group of devices, other data 70, named mailboxes 72 identifying where files are held, as well as specific product data 74 and sharing data 76.

The embedded graph database 36 may be used to manage the tree 24 using standard adjacency list techniques. This creates a platform for using graph-based software tools to manage the tree. Example software tools, in addition to the graph sorter for DFS topological sorting, may include tools for:

1. Cycle detection. A tree is a simple Directed Acyclic Graph (DAG). Having loops in the tree may be problematic. Cycles in large graphs can be detected with suitable algorithms.

2. Topologically related diagnostics and analysis. For example, programmatically traversing the distribution tree 24 may be performed to identify unintentionally disconnected (orphan) devices. A diagnostic utility can detect/correct any deviations in the actual fleet from what the distribution manager understands the fleet connectivity to be.

At intervals, the network controller 32 may receive updates and/or exception requests. Example updates include changes to parent/child relationships (e.g., device 12 has been made a child of device 18, a new device is being added to the graphics department devices), changes in attributes (e.g., device 12 has been moved to a different building, device 16 is to receive update files 34 twice weekly). The configuration files 34 may be large files, which take a long time to transfer between devices and download. Thus, it may be desirable to modify the tree structure to take load balancing into account.

The exception requests include requests from users of the devices to be provided with exceptions to a configuration file, such as different security settings and so forth. The authorized user may be provided with a user interface for making changes. For example, if the user actuated an add device button in the interface 48, the window allows the user to select a device or devices to be added, select a download schedule, and other aspects, such as selecting an installation schedule. Some of the selections may have default settings, e.g., based on settings for the parent device, which the user may select to modify.

If the user opts to delete a managed device from the tree structure, the children of the deleted managed device (if any) are stored as a separate branch and may prompt the user to reconnect the branch to the updated tree structure or may automatically connect the branch to the parent of the deleted managed device. The changes are displayed in an updated tree structure (not shown) and may be further modified by the user. The database 36 may be updated to reflect the new parent-child connections. It is to be understood that deleting a parent device maintains its descendants/subtree, to make it simple to re-parent (graft) it onto another part of the tree. That is, the underlying structure is not lost. The subtree/children of the deleted parent device are put into a temporary working/holding place until it can be reintegrated into the active tree.

Using the user interface at 48, a new device can be added as a member of the managed trusted community, retired devices can be deleted, or modifications to the tree structure can be made, for example, using a drag-and-drop mechanism. This makes it simple for a user to add, remove or update devices in the file distribution tree 24, including performing bulk operations on multiple devices. For example, the user can minimize or eliminate bottlenecks quickly by reconfiguring the distribution tree to introduce new levels of devices connected via a tree topology so that improved load balancing occurs. Any device can serve as a manager or member of the fleet and this designation is easily established or modified.

The network controller 32 receives notifications of changes made to the tree 24 by a user and stores the changes in the database 36. The network controller 32 may make changes to the file(s) 34. The Root Device 10 becomes a monitoring dashboard, allowing the administrator to visually see fleet status. Having this level of monitoring built-in to every device is useful (because every device can be a fleet manager when setup as a root).

Figure 3:
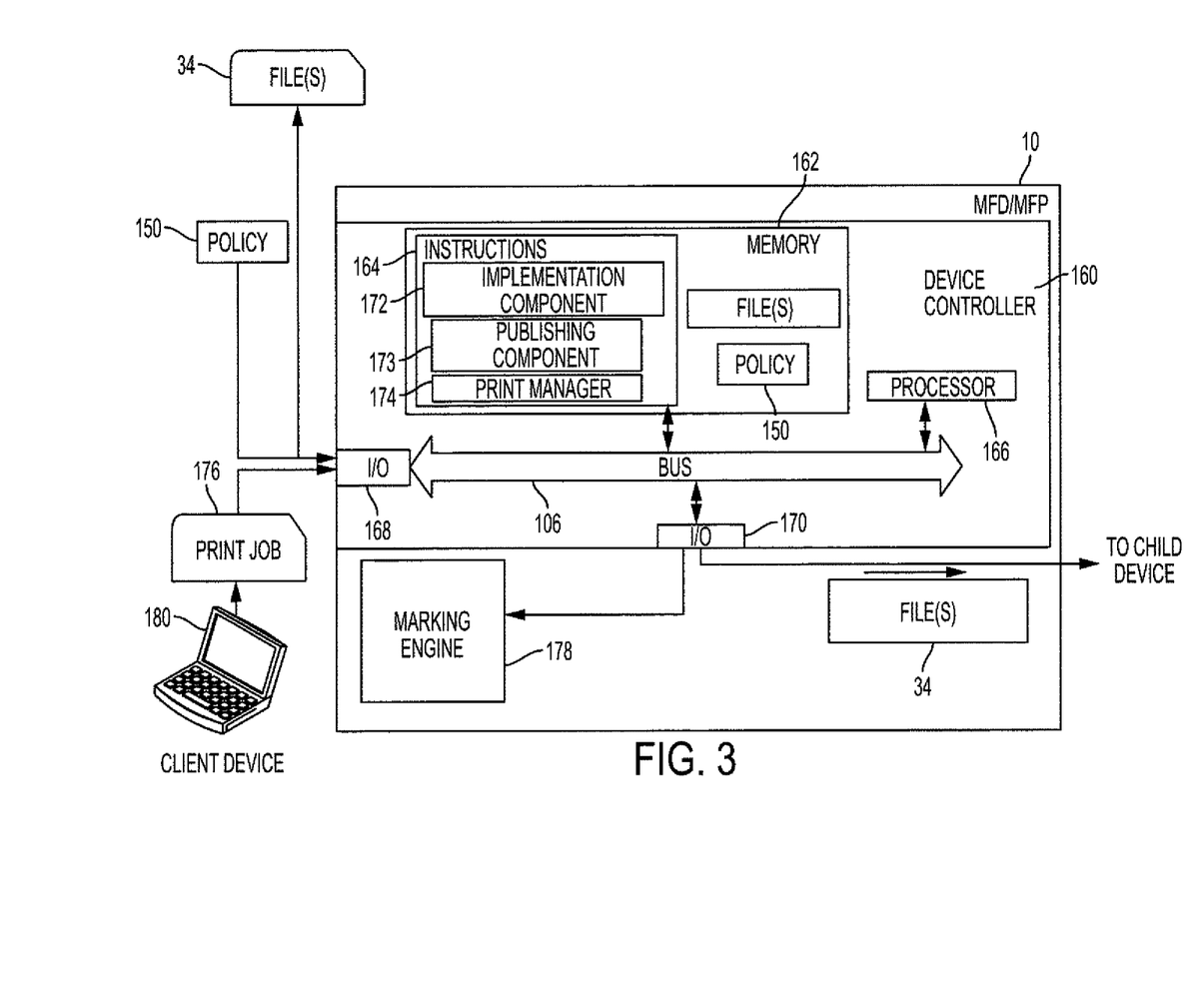
FIG. 3 is a functional block diagram illustrating a managed device.

As illustrated in FIGS. 2 and 3, each of the managed devices 10, 12, 14, 16, 18, 20 includes a respective device controller C 160. The typical device controller 160 includes memory 162, which may store the policy 150, and instructions 164, which are implemented by an associated processor 166. The configuration file 34 is received from the respective parent device by an input device 168 and stored in memory 162. The policy 150 for managing exceptions for the device may be received from the parent device or directly from a higher-level device, such as the network controller 32. An output device 170 transmits the file 34, such as a configuration file, (optionally with the policy) to the children of the device, if there are any. The software instructions 164 include a configuration file implementation component 172, for implementing the configuration file on the respective device in accordance with the policy 150, a file publishing component 173, for sending the configuration file to the children of the managed device, in accordance with the update schedule and/or when a request for download is received from the child devices, and a print manager 174 for controlling printing of received print jobs 176 on an associated marking engine 178. In the case of an MFD/MFP, the configuration file 34 may thus include updates to printer settings, security and so forth.

Each of the managed devices 10, 12, etc., may be similarly configured, with a configuration file implementation component 172 and file publishing component 173. In this way, even if the managed device currently has no children in the distribution tree 24, it is ready to perform the functions of a Parent Device if its position in the tree 24 is changed.

The MFD/MFP 10 may receive print jobs 176 from a source device 180, such as a user's computing device, network server, scanner, USB device, smartphone, or the like. Each print job 176 may include one or more images, such as text, graphics, photographs, or the like, to be printed. The print manager 174 may be instructed by the configuration file implementation component to control the printing in accordance with the configuration file 34, as modified by the policy 150 for that device. The print manager therefore controls the execution of the print jobs 176 by the marking engine 178 accordingly. The marking engine 178 includes hardware elements for rendering the digital print job images on a print media substrate, such as paper, using a marking material or materials, such as colored inks or toners and for outputting the printed sheets.

Figure 4:
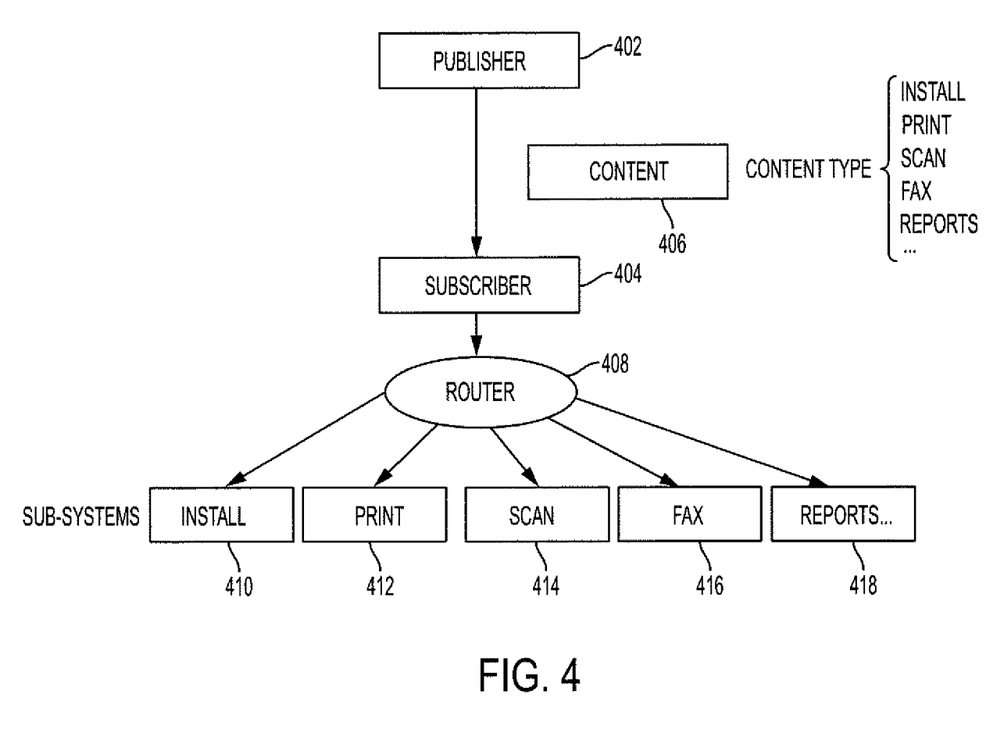
FIG. 4 illustrates an exemplary file routing mechanism and system in accordance with an aspect of the exemplary embodiment.

FIG. 4 illustrates a file distribution mechanism, which includes a publishing device 402, such as device 10, and at least one subscribing device 404, such as any of the devices 12, 14, 16, 18, 20. Thus, the publisher 402 sends content 406 to the subscriber 404. The content 406, for example, may include, but is not limited to, configuration information for one or more sub-systems and/or services, including, but not limited to, Install, Print, Scan, Fax, Reports, etc. The subscriber 404, in turn, routes the content via a router 408 to the appropriate sub-system, including, but not limited to, Install 410, Print 412, Scan 414, Fax 416, Reports 418, etc. It should be noted that the sub-systems and/or services are not limited to those internal to the device. That is, content could be routed to another MFD/MFP device. For example, in the case of no FAX card on the current machine, the file could be routed to a machine which has a card.

The computer-implemented system 30 may include thus include one or more computing devices 32, 50, 160, each of which may be a PC, such as a desktop, a laptop, palmtop computer, portable digital assistant (PDA), server computer, microprocessor, cellular telephone, tablet computer, pager, combination thereof, or other computing device capable of executing instructions for performing the exemplary method.

The memory of the illustrated computing devices 32, 50, 160 may include any type of non-transitory computer readable medium such as random-access memory (RAM), read only memory (ROM), magnetic disk or tape, optical disk, flash memory, or holographic memory. The input/output interfaces may comprise a modulator/demodulator (MODEM) a router, a cable, and and/or Ethernet port. The digital processors of the computing devices 32, 50, 160 can be variously embodied, such as by a single-core processor, a dual-core processor (or more generally by a multiple-core processor), a digital processor and cooperating math coprocessor, a digital controller, or the like.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 5:
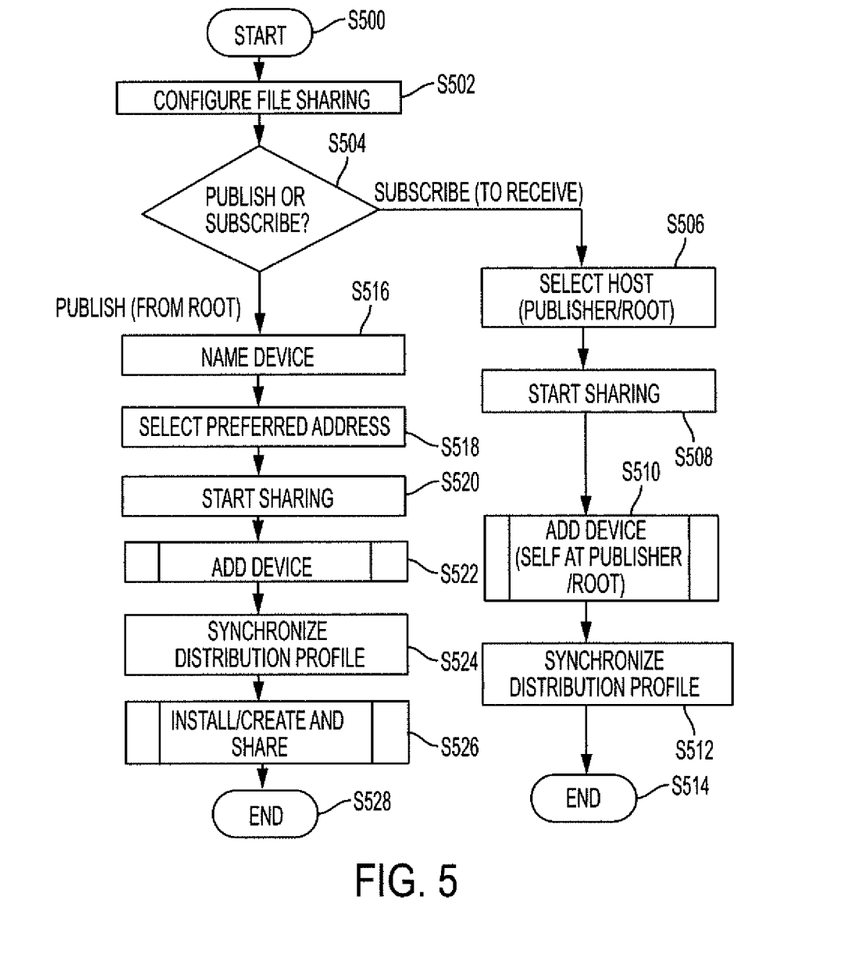
FIG. 5 illustrates a method of configuring file sharing which may be performed by the system of FIG. 2.

FIG. 5 illustrates a method of configuring file sharing which may be implemented in the exemplary system 30. The method begins at S500.

At S502, the "configure file sharing" function of the target device is accessed via a computing device, such as the client device 50.

At S504, a determination is made as to whether the device will publish files (e.g., the Root/Parent Device 10) or subscribe to receive files (e.g., the Child Device 12, 14, etc.).

If it is determined that the device will subscribe to receive files, then, at S506, the host is selected (i.e., the publisher/Root Device 10).

At S508, the file sharing process begins.

At S510, the device is added to the distribution profile 37. For the root/publisher device 10, the device added is child/self 12.

At S512, the distribution profile 37 is synchronized between the Root Device 10 and the Child Device 12, 14, etc.

The method ends at S514.

On the other hand, if the Root Device 10 is to publish files, then, at S516, the publishing device is named.

At S518, the preferred address format of the Root Device 10 that the Child Device 12, 14, etc. should use to connect is selected.

At S520, file sharing begins.

At S522, one of more other devices, such as the Child Device 12 is added to the distribution profile 37.

At S524, the distribution profile 37 is synchronized between the Root Device 10 and the Child Device 12, 14, etc.

At S526, the file(s) are installed or created and shared with the other device(s).

The method ends at S528.

Figure 6:
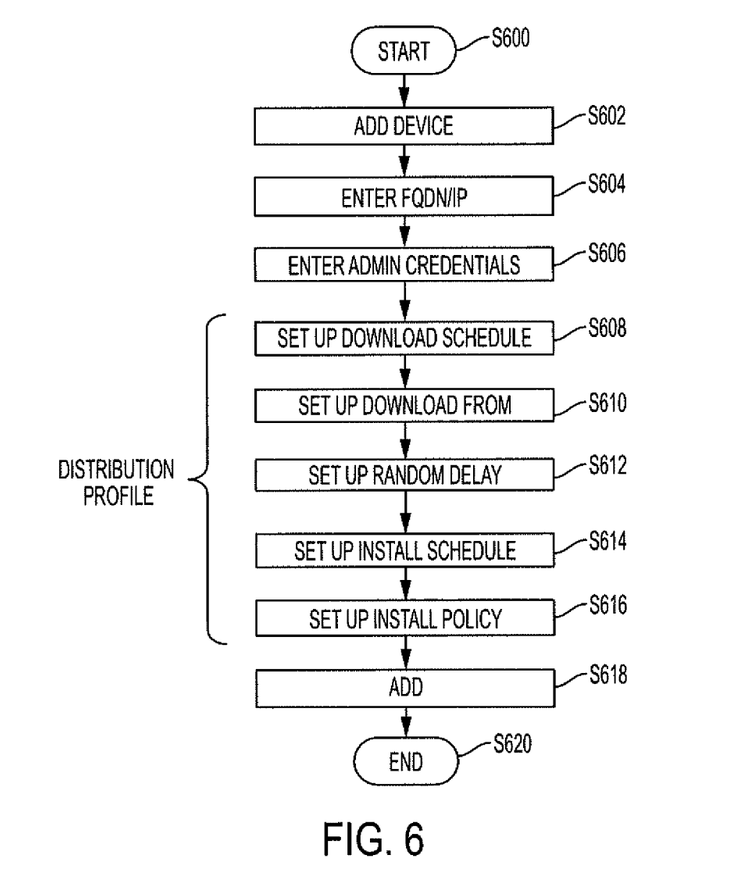
FIG. 6 illustrates a method of adding a device which may be performed by the system of FIG. 2.

FIG. 6 illustrates a method of adding one or more devices at the root 10 which may be implemented in the exemplary system 30. The method begins at S600.

At S602, the "add device" function is accessed via a computing device, such as the client device 50.

At S604, the fully qualified domain name (FQDN) or IP address of each device is entered.

At S606, the administrator credentials of each Child Device 12, 14, etc. are entered.

At S608, the download schedule for each device is set up. The download schedule may include, but is not limited to, install frequency/cadence (daily, weekly, monthly), time of day within possible random offset. The download occurs when a schedule boundary is crossed.

At S610, the location from which to download the file from is set up.

At S612, a random delay is added to each device schedule to spread out the synchronization and to minimize the likelihood that concurrent child download requests to a given Parent Device will cause collisions (exceeding maximum number of concurrent requests allowed).

At S614, the install schedule for each device is set up (e.g., daily, weekly, or immediately upon download) to determine if the files are always installed or if they are only installed if the file has changed from the previous downloaded file. The file(s) can be scheduled for installation immediately (at download) daily, weekly, monthly, etc. The install schedule is optionally separated from the download schedule to let customers install at a time which is convenient for them while the download time may be convenient at a different time. For example, download overnight when the network is quiet and install at 7:00 am when the night shift has ended. It is noted that the download and install schedules are separate and distinct. For example, fleet downloads can occur in the evening during the week, but all devices install over the weekend whereby all devices are brought up to the same software version at once. A possible install schedule option can be defaulted to OFF. Once it has been verified that the all machines in the fleet have downloaded content successfully, an "install now" trigger or turning the install schedule ON can further ensure a consistent install experience that spans the fleet.

At S616, in conjunction with the install schedule, the install constraints for each device is set up. For example, the install constraints can be: (a) install new files only (this prevents unnecessary installs of the same content) or (b) install always (useful for resetting the system to a standard configuration. The install constraints may be applied/invoked when the install boundary is reached.

All the parameters set up in S608, S610, S612, S614, and S616 collectively comprise the distribution profile 37 for each Child Device.

At S618, one or more of the Child Devices 12, 14, etc. are added to the Trust Community 22, the distribution profile 37 is save/persisted in the database 36, and the profile information is synchronized with Child Device(s).

The method ends at S620.

Figure 7:
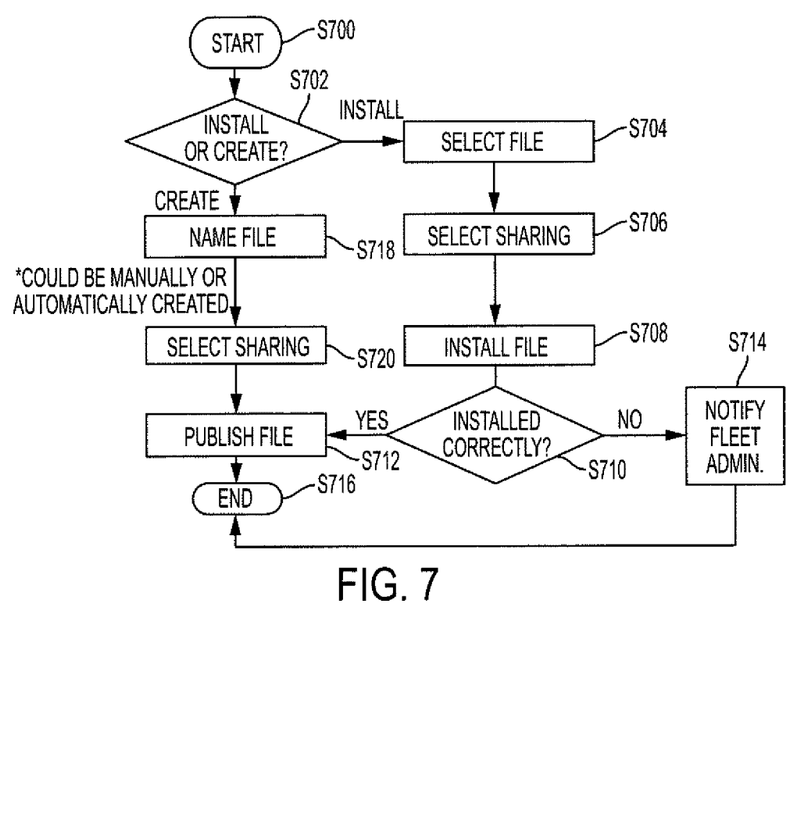
FIG. 7 illustrates a method of installing/creating and sharing a new file which may be performed by the system of FIG. 2.

FIG. 7 illustrates a method of installing/creating and sharing at least one new file which may be implemented in the exemplary system 30. The method begins at S700.

At S702, via a computing device, such as the client device 50, a determination is made as to whether to install or create a new file, such as a configuration file.

If a new file is to be installed, then, at S704, a file is selected. Alternatively, the files may be created or installed through an automatic process, such as a schedule, or when an event, such as a configuration change, has happened.

At S706, "sharing" is selected. The system administrator can determine if the file needs to be installed before it is published.

At S708, the file is installed.

At S710, a determination is made as to whether the file has been installed correctly. Various pre-checks are implemented on the downloaded content (message digest/fingerprint) to ensure correctness of payload, i.e., that it was not corrupted or compromised from a security perspective. This feature is very helpful—if settings can be changed it can cause security vulnerabilities. Once it passes these checks, it performs the install and verifies that was successful. Only then will it make the content/file available for subsequent downloads. Alternatively, the requirement to force a successful install may be a system/device policy setting, where content is simply relayed through the distribution topology without requiring an install. If the file installation is successful, the file is published so that files that have problems are not propagated. Alternatively, if the system administrator has determined the file does not need to be installed before being published then after storage, the file is published.

At S712, the file is published after it is installed correctly on a given machine. This prevents a "viral" scenario where a bad file is propagated thru the system.

Otherwise, at S714, the failure status will be communicated to the fleet administrator via current mechanisms.

The method ends at S716.

Otherwise, if a new file is to be created, then, at S718, a file is named. The file could be manually or automatically created.

At S720, "sharing" is selected, if the system administrator desires the file to be published. Content can be installed without requiring sharing. For the content/files to be shared via fleet management, sharing must be enabled.

At S712, the file is published.

The method ends at S716.

Figure 8:
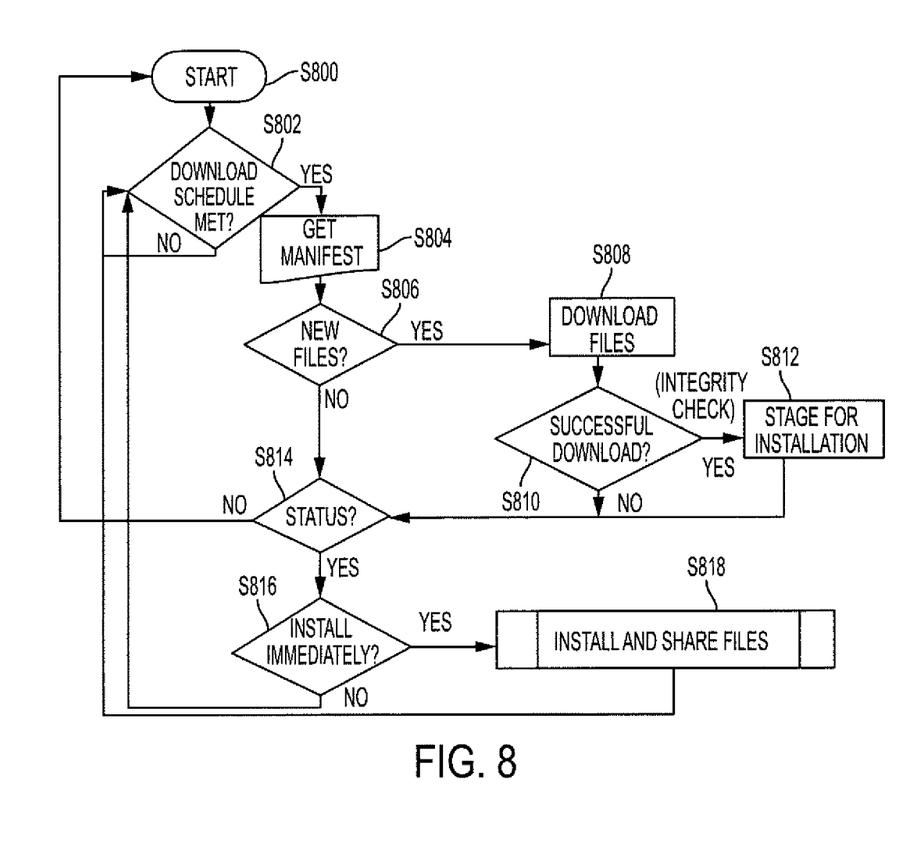
FIG. 8 illustrates a method of downloading files which may be performed by the system of FIG. 2.

FIG. 8 illustrates a method of downloading one or more files which may be implemented in the exemplary system 30. The method begins at S800.

At S802, a determination is made as to whether the download schedule has been met. The Root Device 10, for example, can define schedules, but they are synced to the Child Device(s) 12, 14, etc. when added to the fleet tree. Each child device manages its individual schedule (they could all be different, e.g., staggered). When a child device schedule boundary has been met, as determined by the child device, the child device then performs the download/install operation.

Thus, if the download schedule has not been met, then the method returns to S802.

Otherwise, if the download schedule has been met, then, at S804, the manifest is obtained. The manifest at least identifies the file(s) available to download on the appropriate child device(s).

At S806, a determination is made as to whether there are one or more new files to be downloaded.

If there are one or more new files, then, at S808, any such files are downloaded on the child device. This is more than a simple file download mechanism in that files downloaded can be further cascaded to child devices (possibly modified and/or extended) in the distribution tree 24. Additional safeguards have been created to ensure robust distribution. Downloaded files are placed in a staging area and verified for integrity prior to installation.

At S810, a determination is made as to whether there has been a successful download of files.

If the files have been successfully downloaded, then, at S812, the file is staged for installation. If there are any issues the file is not installed, and errors are communicated to the fleet of managed devices.

It is noted that since a file is typically redistributed within the distribution tree 24, separate staging and sharing repositories are used. Thus, on download, the file is saved to the staging area. After successful install, files are moved to a sharing area and made available whereby connected child devices may now download any successfully installed files per schedule.

At S814, a determination is made as to the download status.

If the files have been downloaded, then, at S816, a determination is made as to whether the files should be installed immediately by checking the installation schedule for the device.

If the files are to be installed immediately, then at S818, the files are installed and shared. The method returns to S802.

If the files are not to be installed immediately, then the method returns to S802.

Otherwise, if the files have not been downloaded, then the method returns to S800.

Figure 9:
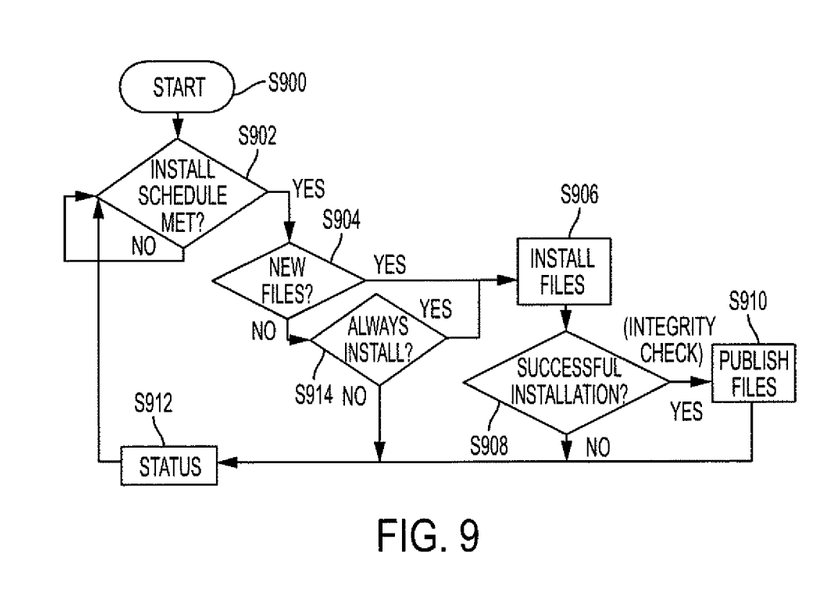
FIG. 9 illustrates a method of installing and sharing files which may be performed by the system of FIG. 2.

FIG. 9 illustrates a method of installing and sharing files which may be implemented in the exemplary system 30. The method allows for staging versus a separate publishing area to ensure robustness. In an "unattended" distribution, by virtue of verifying a node in the tree, files are installed correctly before passing on content/files, which ensures that bad files are not propagated. The method thus ensures integrity and "catches" problem installs before it publishes to children (descendants). The method begins at S900.

At S902, via a device, such as the client device 50, a determination is made as to whether the installation schedule has been met.

If the installation schedule has not been met, then the method returns to S902.

Then at S904 (i.e., the installation schedule has been met), a determination is made as to whether the files are new and should be installed. If the files are not new then, at S914, the Install Policy is checked to see if the files should be reinstalled (by the policy). The system will reinstall even if it has already installed them before, if the policy is set to "always install".

Then at S906, if the files need to be installed/reinstalled (based on S904 and S914) the files are installed on the device.

At S908, a determination is made as to whether the files were successfully installed (integrity check).

If the files were successfully installed, then at S910, the files are published.

At S912, the status is updated.

All status information is communicated to the managing root device for monitoring and problem resolution, as needed. Distribution status between downstream parent/child devices is also shared.

As part of distribution, each device has native contention management and randomization of schedules to throttle concurrent downloads and reduce the likelihood of device download request collisions. With large files (e.g., product software upgrades) limiting concurrent requests and downloads ensures a parent isn't overloaded processing requests.

Next, the method returns to S902.

As discussed above, the exemplary embodiment provides Native Scalable Fleet Management (peer-to-peer). A Trust Community uses any one device as the interface with native (built-in) fleet manager/administrator, non-native (external) fleet manager/administrator, or a hybrid (combination of built-in and external). At least one access token is created, and each community created is named. Devices are added to a list of potential members (device list). Device credentials are used to authenticate to make a member. Each member is given an access token to allow later operations for a simple, seamless log-in mechanism. This prevents adding devices that are already in other Trust Communities. Members may be deleted as needed. Further, members may be re-keyed. That is, security access tokens on one, some, or all members may be refreshed, and/or two or more Trust Communities may be combined.

The fleet of devices may be organized (1) as a graph, including layers where peer devices help operations, (2) as a tree, (3) using static topology (changed only by explicit demand of system administrator), and/or (4) using dynamic topology (Self-organizing, dynamic routing). Load balancing is achieved by organizing relationships between devices to share work and traffic. For example, layers of a tree may be introduced so that many devices share the workload for the next layer. Devices can automatically spread operations over windows of time to avoid spikes in workload. Note that it is possible to have multiple concurrent tree/topologies for different purposes (e.g., overlapping trees).

As discussed above, the fleet is generally organized in a tree structure. In that case, each topology is named (e.g., "accounting printers"). Members may be added to and/or deleted from the topology/tree, and member relationships may be re-organized (e.g., "Root-child-grandchildren"). Structure and relationships may be visualized along with details of status and schedules of each device using cached data for performance. A device whose user-interface is being used to view the Tree Structure automatically begins refreshing the cached data (status, schedules, policies) when a user begins interacting. The tree structure uses an efficient, simple drag-and-drop paradigm, which provides ease of use and shows relationships naturally.

The exemplary embodiment also includes the ability to put members on hold or offline (i.e., unassociated). This feature provides for a temporary working area for reorganizing efficiently, helps to preserve branch relationships, schedules, policies, and minimizes potential for errors (e.g., if a device is deleted).

Download and install schedules may be set up on a per device or bulk basis. Policies may include installing if new content and/or installing always (reinstall every schedule boundary to keep device in compliance). Content may be redirected to one or more services or subsystems as appropriate (e.g., fax jobs to fax subsystem). The user or the device creates or uploads content for the community to use. The initial node and other nodes that will relay the content check content before use. Each Device puts content into a staging area before re-distribution. Content may be checked for security, integrity, and/or completeness via checksums, digitally signed certificates, and/or internal structure checks. Content is verified locally at every topology node before relaying it to others. The above checks ensure that content that has corruption or other problems is not moved to the publish area. The device puts content into the publish area. Content may be deleted on-demand or after expiration or if content is bad.

With native fleet manager/administrator (peer-to-peer), no external server is needed to see the health of the fleet. This system co-exists with non-native external management servers. Native device status is reported through the native fleet management system (e.g., communication good/bad, out of paper, needs toner).

A clear native interface shows any communication problems. And the exemplary embodiment includes the ability to traverse the topology and database to locate missing or incorrect relationship information as well as the ability to export to graph topology information to leverage external management tools for further analysis.

The exemplary embodiment includes automated backup and restore functions, import/export functions, and redundant system information via replication. Transfer of control of the fleet between peer devices may be made for disaster recovery, for convenience, for local sub trees, and/or for upgrading to external management systems.

The supporting system infrastructure may include web services and/or embedded databases in the devices, including SQL database and/or Graph database. These features enable scalability, database integrity, and performance and leverages database replication services. Directed graphs and adjacency lists allow the user to use many external and advanced algorithms. Changes to devices or reviewing statuses can be done from any device web page to see any other device or all of them in one place.

The methods illustrated in FIGS. 5-9 may be at least partially implemented in a computer program product or products that may be executed on a computer or computers. The computer program product(s) may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the methods may be implemented in transitory media, such as a transmittable carrier wave in which the control program is embodied as a data signal using transmission media, such as acoustic or light waves, such as those generated during radio wave and infrared data communications, and the like.

The exemplary methods may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing a part of the flowcharts shown in FIGS. 5-9, can be used to implement the methods. As will be appreciated, while the steps of the methods may all be computer implemented, in some embodiments one or more of the steps may be at least partially performed manually.

As will be appreciated, the steps of the methods need not all proceed in the order illustrated and fewer, more, or different steps may be performed.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of providing native scalable management of a fleet of managed devices, the method comprising:
   establishing a Trust Community, which includes a sub-set of the managed devices in the fleet, wherein each of the managed devices includes a processor;
   organizing the Trust Community;
   configuring one of the managed devices in the organized Trust Community as a Root Device to publish files via a file sharing function;
   adding the Root Device to a distribution profile stored in a database;
   creating or downloading one or more files via the Root Device; and
   sharing the one or more files with other devices in the organized Trust Community via the Root Device,
   wherein any devices in the Trust Community that are on hold or offline are placed in a temporary working area for reorganizing,
   wherein download and install schedules for the one or more files are set up on a per device or a bulk basis according to one or more policies such as installing if new content and/or installing always,
   wherein files that are to be shared are placed into a staging area before re-distribution and checked for security, integrity, and/or completeness via checksums, digitally signed certificates, and/or internal structure checks.

2. The method of claim 1, wherein the Trust Community is organized as a graph including layers, as a tree, by using a static topology which is changed only by explicit demand of a system administrator, and/or by using a dynamic topology which is self-organizing and includes dynamic routing.

3. The method of claim 2, further comprising traversing the topology and the database to locate missing or incorrect relationship information and exporting graph topology information for analysis.

4. The method of claim 1, wherein the managed devices are organized as nodes of a tree structure, wherein one of the managed devices in the tree structure is defined as the Root Device and each device in the tree has a Parent Device, zero or one or more sibling devices, and zero or one or more Child Devices.

5. The method of claim 1, wherein the one or more files shared comprise one or more of software update files, user-content files such as print jobs, fax jobs, scanned images or other user generated files, encrypted configuration files, and workflow templates add-on files.

6. The method of claim 1, wherein the fleet of managed devices comprises one or more of printers, copiers, scanners, and multifunction devices (MFDs).

7. The method of claim 1, wherein transfer of control of the fleet between peer devices is made for disaster recovery, for convenience, for local sub trees, and/or for upgrading to external management systems.

8. A system for providing native scalable management of a fleet of managed devices, the system comprising:
   memory and a processor configured to:
   establish a Trust Community, which includes a sub-set of the managed devices in the fleet, wherein each of the managed devices includes a processor;
   organize the Trust Community;
   configure one of the managed devices in the organized Trust Community as a Root Device to publish files via a file sharing function;
   add the Root Device to a distribution profile stored in a database;
   create or download one or more files via the Root Device; and
   share the one or more files with other devices in the organized Trust Community via the Root Device,
   wherein any devices in the Trust Community that are on hold or offline are placed in a temporary working area for reorganizing,
   wherein download and install schedules for the one or more files are set up on a per device or a bulk basis according to one or more policies such as installing if new content and/or installing always,
   wherein files that are to be shared are placed into a staging area before re-distribution and checked for security, integrity, and/or completeness via checksums, digitally signed certificates, and/or internal structure checks.

9. The system of claim 8, wherein the Trust Community is organized as a graph including layers, as a tree, by using a static topology which is changed only by explicit demand of a system administrator, and/or by using a dynamic topology which is self-organizing and includes dynamic routing.

10. The system of claim 9, wherein the memory and the processor are further configured to traverse the topology and the database to locate missing or incorrect relationship information and export graph topology information for analysis.

11. The system of claim 8, wherein the managed devices are organized as nodes of a tree structure, wherein one of the managed devices in the tree structure is defined as the Root Device and each device in the tree has a Parent Device, zero or one or more sibling devices, and zero or one or more Child Devices.

12. The system of claim 8, wherein the one or more files shared comprise one or more of software update files, user-content files such as print jobs, fax jobs, scanned images or other user generated files, encrypted configuration files, and workflow templates add-on files.

13. The system of claim 8, wherein the fleet of managed devices comprises one or more of printers, copiers, scanners, and multifunction devices (MFDs).

14. The system of claim 8, wherein transfer of control of the fleet between peer devices is made for disaster recovery, for convenience, for local sub trees, and/or for upgrading to external management systems.

15. A non-transitory computer readable medium operable to perform a set of instructions, wherein when said instructions are executed on a computer, cause the computer to perform a method of providing native scalable management of a fleet of managed devices, the method comprising:
   establishing a Trust Community, which includes a sub-set of the managed devices in the fleet, wherein each of the managed devices includes a processor;
   organizing the Trust Community;
   configuring one of the managed devices in the organized Trust Community as a Root Device to publish files via a file sharing function;
   adding the Root Device to a distribution profile stored in a database;
   creating or downloading one or more files via the Root Device; and
   sharing the one or more files with other devices in the organized Trust Community via the Root Device,
   wherein any devices in the Trust Community that are on hold or offline are placed in a temporary working area for reorganizing,
   wherein download and install schedules for the one or more files are set up on a per device or a bulk basis according to one or more policies such as installing if new content and/or installing always,
   wherein files that are to be shared are placed into a staging area before re-distribution and checked for security, integrity, and/or completeness via checksums, digitally signed certificates, and/or internal structure checks.

16. The non-transitory computer readable medium of claim 15, wherein the Trust Community is organized as a graph including layers, as a tree, by using a static topology which is changed only by explicit demand of a system administrator, and/or by using a dynamic topology which is self-organizing and includes dynamic routing.

17. The non-transitory computer readable medium of claim 16, further comprising traversing the topology and the database to locate missing or incorrect relationship information and exporting graph topology information for analysis.

18. The non-transitory computer readable medium of claim 15, wherein the managed devices are organized as nodes of a tree structure, wherein one of the managed devices in the tree structure is defined as the Root Device and each device in the tree has a Parent Device, zero or one or more sibling devices, and zero or one or more Child Devices.

19. The non-transitory computer readable medium of claim 15, wherein the one or more files shared comprise one or more of software update files, user-content files such as print jobs, fax jobs, scanned images or other user generated files, encrypted configuration files, and workflow templates add-on files and wherein the fleet of managed devices comprises one or more of printers, copiers, scanners, and multifunction devices (MFDs).

20. The non-transitory computer readable medium of claim 15, wherein transfer of control of the fleet between peer devices is made for disaster recovery, for convenience, for local sub trees, and/or for upgrading to external management systems.

* * * * *